US012659648B2

(12) United States Patent
Ren et al.

(10) Patent No.: US 12,659,648 B2
(45) Date of Patent: Jun. 16, 2026

(54) SPEAKER

(71) Applicant: AAC Microtech (Changzhou) Co., Ltd., Changzhou (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 229 days.

(21) Appl. No.: 18/764,349

(22) Filed: Jul. 4, 2024

(65) Prior Publication Data

US 2025/0301255 A1 Sep. 25, 2025

Related U.S. Application Data

(63) Continuation of application No. PCT/CN2024/082715, filed on Mar. 20, 2024.

(51) Int. Cl.

| | |
|---|---|
| ***H04R 1/24*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ................. *H04R 1/24* (2013.01); *H04R 7/04* (2013.01); *H04R 7/18* (2013.01); *H04R 9/025* (2013.01); *H04R 9/046* (2013.01); *H04R 9/06* (2013.01); *H04R 2400/11* (2013.01)

(58) Field of Classification Search

CPC ... H04R 1/24; H04R 7/04; H04R 7/18; H04R 9/025; H04R 9/046; H04R 9/06; H04R 2400/11; H04R 9/063

See application file for complete search history.

(56) References Cited

U.S. PATENT DOCUMENTS

2020/0059727 A1 * 2/2020 Chen ..................... H01F 7/0289

FOREIGN PATENT DOCUMENTS

CN 117278919 A * 12/2023 ............... H04R 9/06

* cited by examiner

*Primary Examiner* — Vivian C Chin
*Assistant Examiner* — Annabelle Kang
(74) *Attorney, Agent, or Firm* — Wiersch Law Group

(57) ABSTRACT

A speaker includes a first frame, a first vibration system, a second frame, a second vibration, and a magnetic circuit system separately driving the first vibration system and the second vibration system to vibrate and sound, the magnetic circuit system includes a lower plate fixed on the first frame, a main magnet stacked and fixed on the lower plate, a main pole plate stacked and fixed on the main magnet, a center auxiliary magnet stacked and fixed on the main pole plate, a center magnet stacked and fixed on the center auxiliary magnet, and an auxiliary pole plate stacked and fixed on the center magnet. Compared with the related art, the speaker disclosed by the present disclosure could increase the thickness of the center magnet and enhance the magnetic flux of the magnetic circuit system.

7 Claims, 4 Drawing Sheets

A-A

SPEAKER

FIELD OF THE INVENTION

The invention relates to the technical field of acoustic technology, in particular to a speaker.

BACKGROUND

A speaker device is a device that converts electrical signal energy into sound energy, and according to the structural distinction, it includes a speaker device with a single vibration system and a speaker device with a double vibration system.

In the related art, the speaker device with a double vibration system, comprises a first frame, a first vibration system fixed with the first frame, a second frame, a second vibration system fixed with the second frame, and a magnet circuit system drives the first vibration system and the second vibration system respectively to sound.

The magnet circuit system comprises a lower plate fixed with the first frame, a main magnet stacked and fixed with the lower plate, a first auxiliary magnet surrounding the main magnet, a main pole plate in the form of a flat plate and stacked and fixed with the main magnet, a center auxiliary magnet stacked and fixed with the main pole plate, and a main center magnet stacked and fixed with the center auxiliary magnet close to the main pole plate.

In the magnetic circuit system described above, since the center magnet needs to be stacked on the main pole plate which is in the shape of a flat plate, the thickness of the center magnet is limited, i.e., the magnetic flux of the magnetic circuit system is limited, and it is not possible to maximize the magnetic flux thereof.

Therefore, it is desired to provide an improved speaker to solve the above problems.

SUMMARY

In one aspect, the present disclosure provides a speaker comprising: a first frame, a first vibration system, a second frame, a second vibration system, and a magnetic circuit system, the first vibration system is a first vibration system fixed with the first frame, the first vibration system includes a first diaphragm fixed with the first frame and a first voice coil driving the first diaphragm to vibrate; a second vibration system is fixed with the second frame, the second vibration system includes a second diaphragm fixed with the second frame and a second voice coil driving the second diaphragm to vibrate; the magnetic circuit system separately is driving the first vibration system and the second vibration system to vibrate and sound; the first vibration system is coaxially disposed with the second vibration system, the first vibration system and the second vibration system are supported by the first frame and the second frame separately and located at two opposite sides of the magnetic circuit system, a first magnetic gap and a second magnetic gap are located at two opposite sides of the magnetic circuit system separately, the first voice coil and the second voice coil are inserted in the first magnetic gap and the second magnetic gap separately, the magnetic circuit system comprises a lower plate fixed with the first frame, a main magnet stacked and fixed on a side of the lower plate away from the first vibration system, an auxiliary magnet stacked and fixed on the lower plate, an upper plate stacked and fixed on a side of the auxiliary magnet away from the lower plate, a main pole plate stacked and fixed on a side of the main magnet away from the lower plate, a center auxiliary magnet stacked and fixed on a side of the main pole plate away from the main magnet, a center magnet stacked and fixed on a side of the center auxiliary magnet close to the main pole plate, and an auxiliary pole plate stacked and fixed on a side of the center magnet away from the center auxiliary magnet, the upper plate and the main pole plate are separated apart from each other for forming a second magnetic gap, there is a first through hole penetrating through the main pole plate along a vibrating direction of the first diaphragm, there is a second through hole penetrating through the main magnet along the vibration direction, there is a third through hole penetrating through the lower plate along the vibrating direction, the first through hole, the second through hole and the third through hole are provided coaxially orthogonal to each other, the center magnet passes through the first through hole and the second through hole in turn, the center magnet is spaced apart from the main pole plate and the main magnet, the auxiliary magnet surrounding the main magnet is spaced apart from the main magnet, the upper plate is arranged in a ring shape and fixed with the second frame, the auxiliary pole plate is spaced apart from the lower plate for forming the first magnetic gap.

Further, a side of the upper plate away from the auxiliary magnet is fixed with the second frame.

Further, the first vibration system further comprises a first elastic member fixed with the first frame and a side of the first voice coil close to the first diaphragm respectively, the first diaphragm is fixed with a side of the first elastic member away from the second voice coil.

Further, the second vibration system further comprises an elastic supporting assembly and a skeleton in a ring shape, one end of the elastic supporting assembly is fixed with the second frame, the other end of the elastic supporting assembly is fixed with an outer peripheral edge of the skeleton, an inner peripheral edge of the skeleton is fixed with a side of the second voice coil close to the second diaphragm.

Further, the elastic supporting assembly comprises a second elastic member and an auxiliary diaphragm, an end of the second elastic member is fixed with the second frame, the other end of the second elastic member is fixed with the outer peripheral edge of the skeleton, the auxiliary diaphragm is fixed with a side of the second elastic member away from the second frame.

Further, the second diaphragm comprises an outer suspension, an inner suspension spaced apart from the outer suspension, and a fixing portion extending from an inner peripheral edge of the inner suspension, the inner suspension and the outer suspension are in ring shapes, an inner peripheral edge of the outer suspension is fixed with the second frame, an inner peripheral edge of the outer suspension and an outer peripheral edge of the inner suspension are fixed with the skeleton respectively, a side of the fixing portion close to the magnetic circuit system is fixed with a side of the center auxiliary magnet away from the main pole plate.

Further, a magnetization direction of the main magnet is parallel to a vibration direction of the first diaphragm, the magnetization direction of the auxiliary magnet, the center auxiliary magnet and the center main magnet is parallel and opposite to that of the main magnet.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

Figure 1:
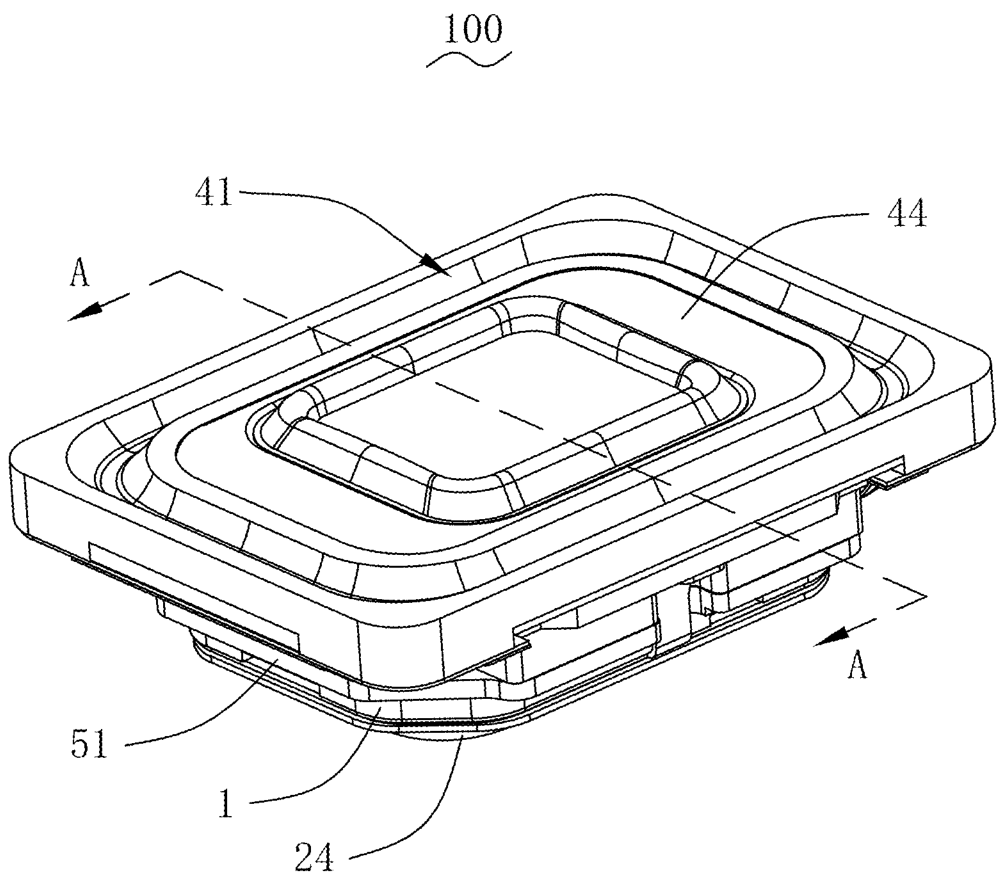
FIG. 1 is an isometric view of a speaker in accordance with the present disclosure.

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Figure 2:
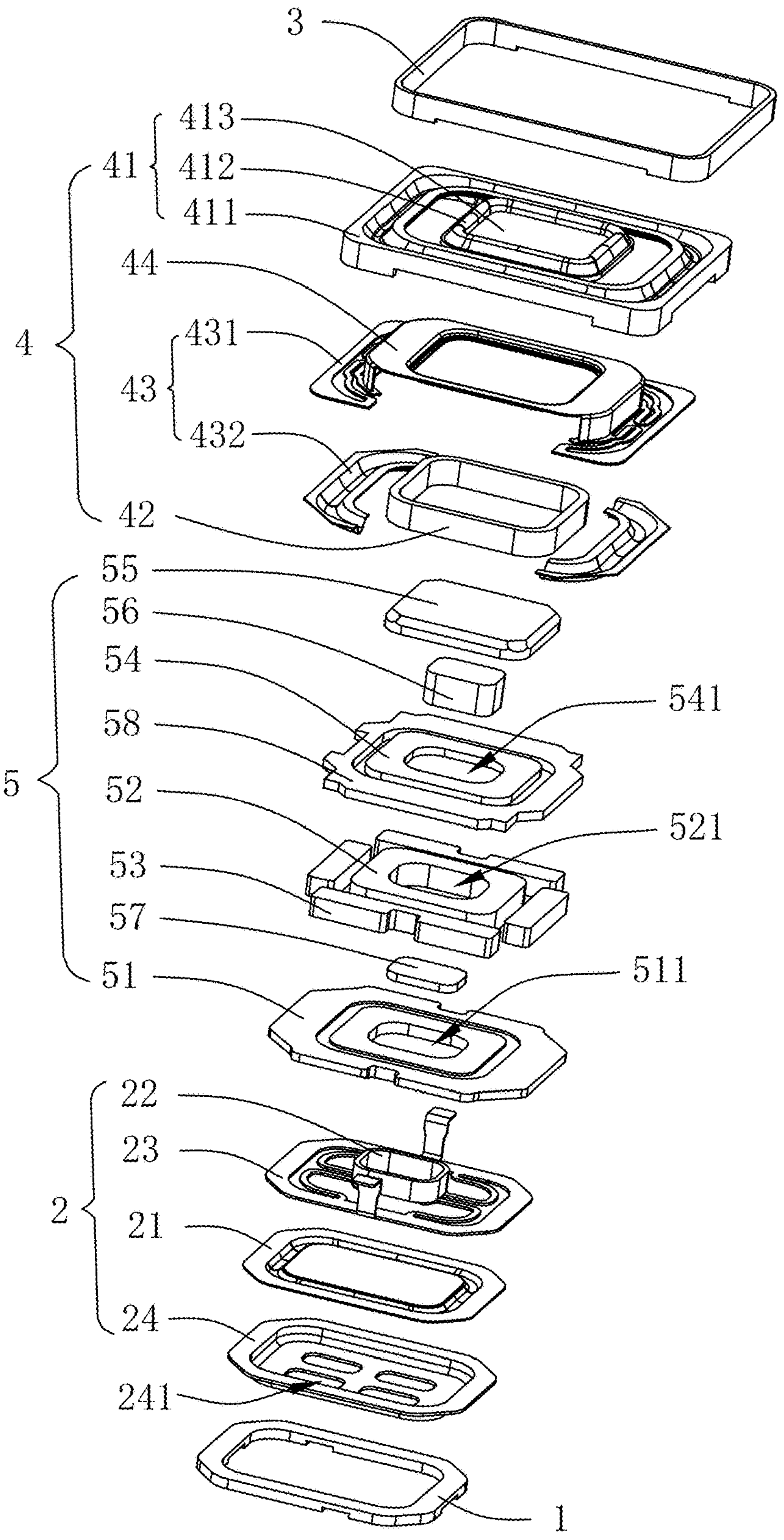
FIG. 2 is an explode view of the speaker in accordance with the present disclosure.
Figure 3:
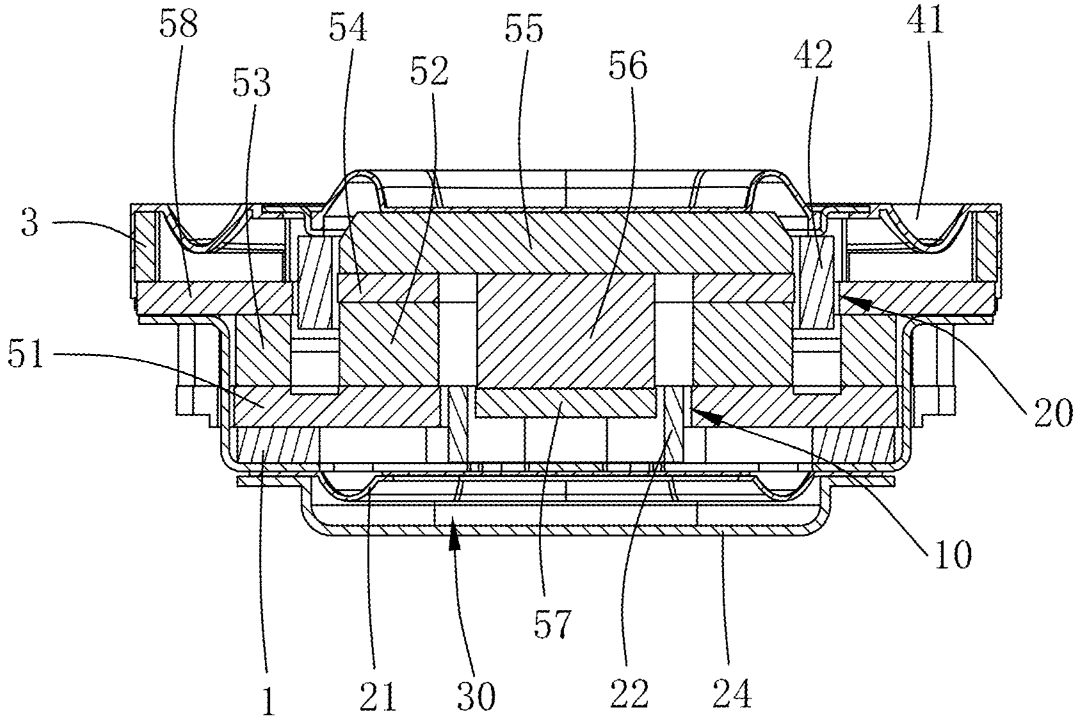
FIG. 3 is a cross-sectional view along the line A-A in FIG. 1.

As shown in the FIGS. 1-3. The present invention discloses a speaker 100, which includes a first frame 1, a first vibration system 2 fixed with the first frame 1, a second frame 3, a second vibration system 4 fixed with the second frame 3, and a magnetic circuit system separately driving the first vibration system 2 and the second vibration system 4 to vibrate and sound, the first vibration system 2 is coaxially disposed with the second vibration system 4, the first vibration system 2 and the second vibration system 4 are supported by the first frame 1 and the second frame 5 separately and located at two opposite sides of the magnetic circuit system 5.

The first frame 1, the first vibration system 2, and the magnetic circuit system 5 form the receiver function portion or tweeter portion of the speaker 100. The second frame 3, the second vibration system 4, and the magnetic circuit system 5 form the speaker portion or bass portion of the speaker 100.

The first vibration system 2 includes a first diaphragm 21 and a first voice coil 22 driving the first diaphragm 21 to vibrate. The speaker 100 further includes a front cover 24 covering the frames and spaced apart from the first diaphragm 21 for forming a front cavity 30. The front cover 24 is provided with a sound outlet aperture 241 penetrating the front cover 24 along the vibration direction of the first diaphragm 21.

The first vibration system 2 includes a first elastic member 23 fixed with the first frame 1 and a side of the first voice coil 22 close to the first diaphragm 21 respectively, the first diaphragm 21 is fixed with a side of the first elastic member 23 away from the second voice coil 42.

The second frame 3, the second vibration system 4, and the magnetic circuit system 5 are collectively enclosed to form a sound generating inner cavity.

The second vibration system 4 includes a second diaphragm 41 fixed with the second frame 3 and a second voice coil 42 driving the second diaphragm 41 to vibrate.

The second vibration system 4 further includes an elastic supporting assembly 43 and a skeleton 44 in a ring shape, one end of the elastic supporting assembly 43 is fixed with the second frame 3, the other end of the elastic supporting assembly 43 is fixed with an outer peripheral edge of the skeleton 44, an inner peripheral edge of the skeleton 44 is fixed with a side of the second voice coil 42 close to the second diaphragm 41.

The elastic supporting assembly 43 includes a second elastic member 431 and an auxiliary diaphragm 432, one end of the second elastic member 431 is fixed with the second frame 3, the other end of the second elastic member 431 is fixed with the outer peripheral edge of the skeleton 44, the auxiliary diaphragm 432 is fixed with a side of the second elastic member 431 away from the second frame 3. The amount of the second elastic member 431 is two, the amount of the auxiliary diaphragm 432 is two, one of the auxiliary diaphragm 432 is fixed with one of the second elastic member 431, and the two second elastic members 431 are fixed with opposite sides of the second frame 3 respectively.

The second diaphragm 41 includes an outer suspension 411, an inner suspension 412 spaced apart from the outer suspension 411, and a fixing portion 413 extending from an inner peripheral edge of the inner suspension 412, the inner suspension 412 and the outer suspension 411 are in ring shapes, an outer peripheral edge of the outer suspension 411 is fixed with the second frame 3, an inner peripheral edge of the outer suspension 411 and an outer peripheral edge of the inner suspension 412 are fixed with the skeleton 44 respectively.

The magnetic circuit system 5 includes a lower plate 51 fixed with the first frame 1, a main magnet 52 stacked and fixed on a side of the lower plate 51 away from the first vibration system 2, an auxiliary magnet 53 stacked and fixed on the lower plate 51, a main pole plate 54 stacked and fixed on a side of the main magnet 52 away from the lower plate 51, and a center auxiliary magnet 55 stacked and fixed on a side of the main pole plate 54 away from the main magnet 52. There is a first through hole 541 penetrating through the main pole plate 54 along a vibrating direction of the first vibration system 2, there is a second through hole 521 penetrating through the main magnet 52 along the vibration direction, there is a third through hole 511 penetrating through the lower plate 51 along the vibrating direction, the first through hole 541, the second through hole 521 and the third through hole 511 are provided coaxially orthogonal to each other. The auxiliary magnet 53 is surrounding the main magnet 52 and spaced apart from the main magnet 52.

The magnetic circuit system 5 further includes a center magnet 56 stacked and fixed on a side of the center auxiliary magnet 55 close to the main pole plate 54, the center magnet 56 passes through the first through hole 541 and the second through hole 521 in turn, the center magnet 56 is spaced apart from the main pole plate 54 and the main magnet 52.

Figure 4:
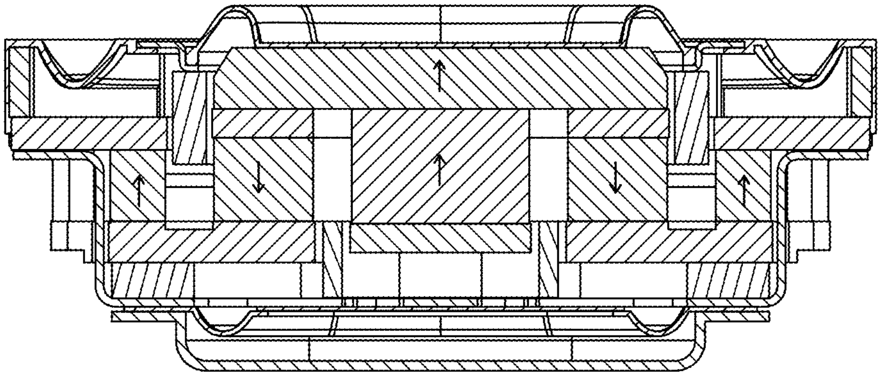
FIG. 4 is a schematic diagram of a magnetizing direction of a magnetic circuit system in the speaker in accordance with the present disclosure.

A magnetization direction of the main magnet 52 is parallel to a vibration direction of the first diaphragm 21, the magnetization direction of the auxiliary magnet 53, the center auxiliary magnet 55 and the center main magnet 56 are parallel and opposite to that of the main magnet 52. As shown in the FIG. 4, in this embodiment, the magnetizing direction of the main magnet 52 is from a side of the main magnet 52 away from the lower plate 51 towards a side of the main magnet 52 close the lower plate 51.

An amount of the auxiliary magnet 53 is four, and the four auxiliary magnets 53 are disposed on each of the four circumferential sides of the main magnet 52 and spaced apart from the main magnet 52, respectively.

The magnetic circuit system 5 includes an auxiliary pole plate 57 stacked and fixed on a side of the center magnet 56 away from the center auxiliary magnet 55, the auxiliary pole plate 57 is located in the third through hole 511, the auxiliary pole plate 57 and the lower plate 51 are spaced apart from each other for forming the first magnetic gap 10, the first voice coil 22 is inserted through the third through hole 511 and inserted and suspended in the first magnetic gap 10.

The magnetic circuit system 5 further includes an upper plate 58 stacked and fixed on a side of the auxiliary magnet 53 away from the lower plate 51, the upper plate 58 is formed in a ring structure and fixed with the second frame 3. A side of the upper plate 58 away from the auxiliary magnet 53 is fixed with the second frame 3.

The upper plate 58 and the main pole plate 54 are spaced apart from each other for forming a second magnetic gap 20, the second voice coil 42 is inserted in the second magnetic gap 20.

A side of the fixing portion 413 close to the magnetic circuit system 5 is fixed with a side of the auxiliary magnet 53 away from the main pole plate 54.

The speaker 100 in this embodiment is provided with the first through hole 541 provided on the main pole plate 54, so that the center magnet 56 can pass through the first through hole 541 and fixed with the center auxiliary magnet 55 to increase the thickness of the center magnet magnet 56, i.e., to enhance the magnetic flux of the magnetic circuit system 5, so that the magnetic flux thereof can be maximized, and also to increase the space of the first through hole 541, so that the magnetic circuit system 5 can be made deeper, therefore the first magnetic gap 10 can be made deeper, i.e., to make the first voice coil 22 vibrate in a larger space with better designability. In addition, the center auxiliary magnet 55 is designed in the shape of a flat plate, which can be used for sealing the rear cavity; the spacing between the center magnet 56 and the main pole plate 54 can be used for the overflow treatment of the magnet when it is glued together to increase the reliability margin; the bass sound effect of the speaker 100 can also be improved by providing the first through hole 541 on the main pole plate 54.

By providing the first through hole 541 in the main pole plate 54, the bass sound effect of the speaker 100 can also be improved. By providing the receiver function portion on the side of the magnetic circuit system 5 away from the speaker portion, i.e., the opposite side of the sound, the tweeter sound effect can be improved or the receiver function can be realized. The tweeter part and the bass part form a coaxial full-band speaker, which can improve the quality sound effect; when the voice call is made, the receiver function part is facing to the earpiece, and the speaker part can be used as a device for inverse-phase muffling.

It should be appreciated by those skilled in the art that various modifications are possible without departing from the spirit or scope of the present invention. The embodiments illustrated above should not be interpreted as limits to the present invention, and the scope of the invention is to be determined by reference to the claims that follow.

What is claimed is:

1. A speaker comprising:

a first frame;

a first vibration system fixed with the first frame, comprising a first diaphragm fixed with the first frame and a first voice coil driving the first diaphragm to vibrate;

a second frame;

a second vibration system fixed with the second frame, comprising a second diaphragm fixed with the second frame and a second voice coil driving the second diaphragm to vibrate; and a magnetic circuit system separately driving the first vibration system and the second vibration system to vibrate and sound; wherein the first vibration system is coaxially disposed with the second vibration system, the first vibration system and the second vibration system are supported by the first frame and the second frame separately and located at two opposite sides of the magnetic circuit system, a first magnetic gap and a second magnetic gap are located at two opposite sides of the magnetic circuit system separately, the first voice coil and the second voice coil are inserted in the first magnetic gap and the second magnetic gap separately, the magnetic circuit system comprises a lower plate fixed with the first frame, a main magnet stacked and fixed on a side of the lower plate away from the first vibration system, an auxiliary magnet stacked and fixed on the lower plate, an upper plate stacked and fixed on a side of the auxiliary magnet away from the lower plate, a main pole plate stacked and fixed on a side of the main magnet away from the lower plate, a center auxiliary magnet stacked and fixed on a side of the main pole plate away from the main magnet, a center magnet stacked and fixed on a side of the center auxiliary magnet close to the main pole plate, and an auxiliary pole plate stacked and fixed on a side of the center magnet away from the center auxiliary magnet, the upper plate and the main pole plate are separated apart from each other for forming a second magnetic gap, there is a first through hole penetrating through the main pole plate along a vibrating direction of the first diaphragm, there is a second through hole penetrating through the main magnet along the vibration direction, there is a third through hole penetrating through the lower plate along the vibrating direction, the first through hole, the second through hole and the third through hole are provided coaxially orthogonal to each other, the center magnet passes through the first through hole and the second through hole in turn, the center magnet is spaced apart from the main pole plate and the main magnet, the auxiliary magnet surrounding the main magnet is spaced apart from the main magnet, the upper plate is arranged in a ring shape and fixed with the second frame, the auxiliary pole plate is spaced apart from the lower plate for forming the first magnetic gap.

2. The speaker as described in claim 1, wherein a side of the upper plate away from the auxiliary magnet is fixed with the second frame.

3. The speaker as described in claim 1, wherein the first vibration system further comprises a first elastic member fixed with the first frame and a side of the first voice coil close to the first diaphragm respectively, the first diaphragm is fixed with a side of the first elastic member away from the second voice coil.

4. The speaker as described in claim 1, wherein the second vibration system further comprises an elastic supporting assembly and a skeleton in a ring shape, one end of the elastic supporting assembly is fixed with the second frame, the other end of the elastic supporting assembly is fixed with an outer peripheral edge of the skeleton, an inner peripheral edge of the skeleton is fixed with a side of the second voice coil close to the second diaphragm.

5. The speaker as described in claim 4, wherein the elastic supporting assembly comprises a second elastic member and an auxiliary diaphragm, an end of the second elastic member is fixed with the second frame, the other end of the second elastic member is fixed with the outer peripheral edge of the skeleton, the auxiliary diaphragm is fixed with a side of the second elastic member away from the second frame.

6. The speaker as described in claim 5, wherein the second diaphragm comprises an outer suspension, an inner suspension spaced apart from the outer suspension, and a fixing portion extending from an inner peripheral edge of the inner suspension, the inner suspension and the outer suspension are in ring shapes, an inner peripheral edge of the outer suspension is fixed with the second frame, an inner peripheral edge of the outer suspension and an outer peripheral edge of the inner suspension are fixed with the skeleton respectively, a side of the fixing portion close to the magnetic circuit system is fixed with a side of the center auxiliary magnet away from the main pole plate.

7. The speaker as described in claim 1, wherein a magnetization direction of the main magnet is parallel to a vibration direction of the first diaphragm, the magnetization direction of the auxiliary magnet, the center auxiliary magnet and the center main magnet is parallel and opposite to that of the main magnet.

* * * * *